United States Patent
Min et al.

(10) Patent No.: US 8,355,669 B2
(45) Date of Patent: Jan. 15, 2013

(54) METHOD AND APPARATUS FOR OPERATING MOVING NETWORK IN A MOBILE COMMUNICATION SYSTEM

(75) Inventors: Chan-Ho Min, Seoul (KR); Yung-Soo Kim, Seongnam-si (KR); Jong-Hyung Kwun, Seoul (KR); Tak-Ki Yu, Yongin-si (KR); Young-Hyun Jeon, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 12/685,918

(22) Filed: Jan. 12, 2010

(65) Prior Publication Data
US 2010/0177738 A1    Jul. 15, 2010

(30) Foreign Application Priority Data
Jan. 12, 2009 (KR) .................. 10-2009-0002209

(51) Int. Cl.
*H04B 7/15* (2006.01)
(52) U.S. Cl. .................. 455/11.1; 455/7
(58) Field of Classification Search .............. 455/11.1, 455/7, 9, 67.11, 422.1, 345
See application file for complete search history.

(56) References Cited

U.S. PATENT DOCUMENTS

| | | | |
|---|---|---|---|
| 7,599,700 B2 * | 10/2009 | Shinozaki | 455/456.1 |
| 7,634,264 B2 * | 12/2009 | Yahagi | 455/422.1 |
| 7,933,551 B2 * | 4/2011 | Shibouta | 455/11.1 |
| 7,983,665 B2 * | 7/2011 | Yahagi | 455/422.1 |
| 8,081,977 B2 * | 12/2011 | Shinozaki | 455/435.1 |
| 2002/0115455 A1 * | 8/2002 | Umstetter et al. | 455/462 |

FOREIGN PATENT DOCUMENTS
KR  10-2007-0078449 A  8/2007

OTHER PUBLICATIONS

Nourizadeh, H et al. 'Performance evaluation of Cellular Networks with Mobile and Fixed Relay Station' In: IEEE 64th Vehicular Technology Conference, 2006 pp. 1-5.

Lei Zhong et al. 'Fast Handover Scheme for Supporting Network Mobility in IEEE 802. 16e BWA System' In: IEEE Wi Com International Conference on Wireless Communications, Networking and Mobile Computing, 2007, pp. 1757-1760.

Dae Wook Byun et al. 'Resource Allocation and Power Control for Mobile Relay in TDD-OFDMA Downlink' In: ICCIT '08. Third International Conference on Convergence and Hybrid Information Technology. 2008, vol. 2, pp. 334-339.

* cited by examiner

*Primary Examiner* — Sonny Trinh
(74) *Attorney, Agent, or Firm* — Jefferson IP Law, LLP

(57) ABSTRACT

A method and an apparatus for operating a moving network in a mobile communication system are provided. A method of a Base Station (BS) for operating a Moving Network (MN) includes determining an operation mode of the MN in a cell by collecting information of the cell, and transmitting the determined operation mode to the MN. The operation mode includes at least one of an Operation ON mode in which the MN maintains links to Mobile Stations (MSs) in a service coverage area of the MN, and an Operation OFF mode in which the MN turns off the links to the MSs in the service coverage area of the MN.

18 Claims, 16 Drawing Sheets

METHOD AND APPARATUS FOR OPERATING MOVING NETWORK IN A MOBILE COMMUNICATION SYSTEM

PRIORITY

This application claims the benefit under 35 U.S.C. §119(a) of a Korean patent application filed in the Korean Intellectual Property Office on Jan. 12, 2009 and assigned Serial No. 10-2009-0002209 and a Korean Patent Application filed in the Korean Intellectual Property Office on Jan. 12, 2010 and assigned Serial No. 10-2010-0002520, the contents of which are herein incorporated by reference.

BACKGROUND OF THE INVENTION

1. Field of the Invention

The present invention relates to a method and an apparatus for operating a moving network in a mobile communication system. More particularly, the present invention relates to a method and an apparatus for managing an operation mode of the moving network at a base station by taking into account conditions in a cell.

2. Description of the Related Art

FIG. 1 illustrates a Moving Network (MN) of the related art. The MN is part of a wireless access technique for offering seamless and reliable service to users in a fast moving vehicle such as bus or train as illustrated in FIG. 1. In the fast moving environment, the MN should provide passengers in the service coverage area with the same service as in the stationary environment. That is, the MN should provide a higher quality service to the user than if the user were serviced by stationary base stations.

In the wireless cellular environment, the MN technique is under discussion as the service model in international standardization organizations, such as the Institute of Electrical and Electronics Engineers (IEEE) 802.16m standardization group and the 3rd Generation Partnership Project (3GPP) Long Term Evolution-Advanced (LTE-Advanced) standardization group, which are working on the International Mobile Telecommunications Advanced (IMT-Advanced) standard. The IEEE 802.16j working group is developing a standard by reflecting a scenario for the MN. Recently, issues relating to the mobility management such as handover or paging in the MN are under discussion.

The MN has the following advantages. The MN can provide a robust communication environment to terminals belonging to the MN, provide mobility by grouping the terminals, maximize resource efficiency, and reduce the power required for use by the terminals.

However, despite these features, the operation of the MN can be less efficient than the non-operation of the MN in a city in terms of the entire system, an example of which is illustrated with reference to FIG. 2.

FIG. 2 illustrates a mobile communication system of the related art including MNs.

Referring to FIG. 2, due to the relatively high traffic density in the city, MNs 211, 213, 215 and 217 interfere with terminals that are directly communicating with a base station 201 and thus increase the probability of resource collision. As a result, use of the MNs in the city can deteriorate the communication condition of the terminals communicating with the base station.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for managing a moving network in a mobile communication system.

Another aspect of the present invention is to provide a method and an apparatus for managing an operation mode of a moving network at a base station by taking into account a condition within a cell in a mobile communication system.

Yet another aspect of the present invention is to provide a method and an apparatus for changing an operation mode at a moving network under control of a base station in a mobile communication system.

Still another aspect of the present invention is to provide a method and an apparatus for collectively determining an operation mode of moving networks within a cell at a base station in a mobile communication system.

A further aspect of the present invention is to provide a method and an apparatus for determining an operation mode per moving network at a base station by taking into account speed and interference of moving networks within a cell in a mobile communication system.

In accordance with an aspect of the present invention, a method of a Base Station (BS) for operating a Moving Network (MN) in a mobile communication system is provided. The method includes determining an operation mode of the MN in a cell by collecting information of the cell, and transmitting the determined operation mode to the MN. The operation mode includes at least one of an Operation ON mode in which the MN maintains links to Mobile Stations (MSs) in a service coverage area of the MN, and an Operation OFF mode in which the MN turns off the links to the MSs in the service coverage area of the MN.

In accordance with another aspect of the present invention, an operating method of an MN in a mobile communication system is provided. The method includes receiving an operation mode from a BS, and switching links to MSs in a service coverage area of the MN according to the operation mode received from the BS.

In accordance with yet another aspect of the present invention, an apparatus of a BS for operating an MN in a mobile communication system is provided. The apparatus includes a controller for determining an operation mode of the MN in a cell by collecting information of the cell, and a communication module for transmitting the determined operation mode to the MN. The operation mode includes at least one of an Operation ON mode in which the MN maintains links to MSs in a service coverage area of the MN, and an Operation OFF mode in which the MN turns off the links to the MSs in the service coverage area of the MN.

In accordance to still another aspect of the present invention, an operating apparatus of an MN in a mobile communication system is provided. The apparatus includes a communication module for receiving an operation mode from a BS, and a controller for switching links to MSs in a service coverage area of the MN according to the operation mode received from the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technique for a base station to determine an operation mode of Moving Networks (MNs) in a cell service coverage area by taking into account conditions in the cell and for the MN to switch the operation mode according to the determination of the base station in a mobile communication system.

Exemplary operation modes of an MN are defined below with reference to FIG. 3.

Figure 1:
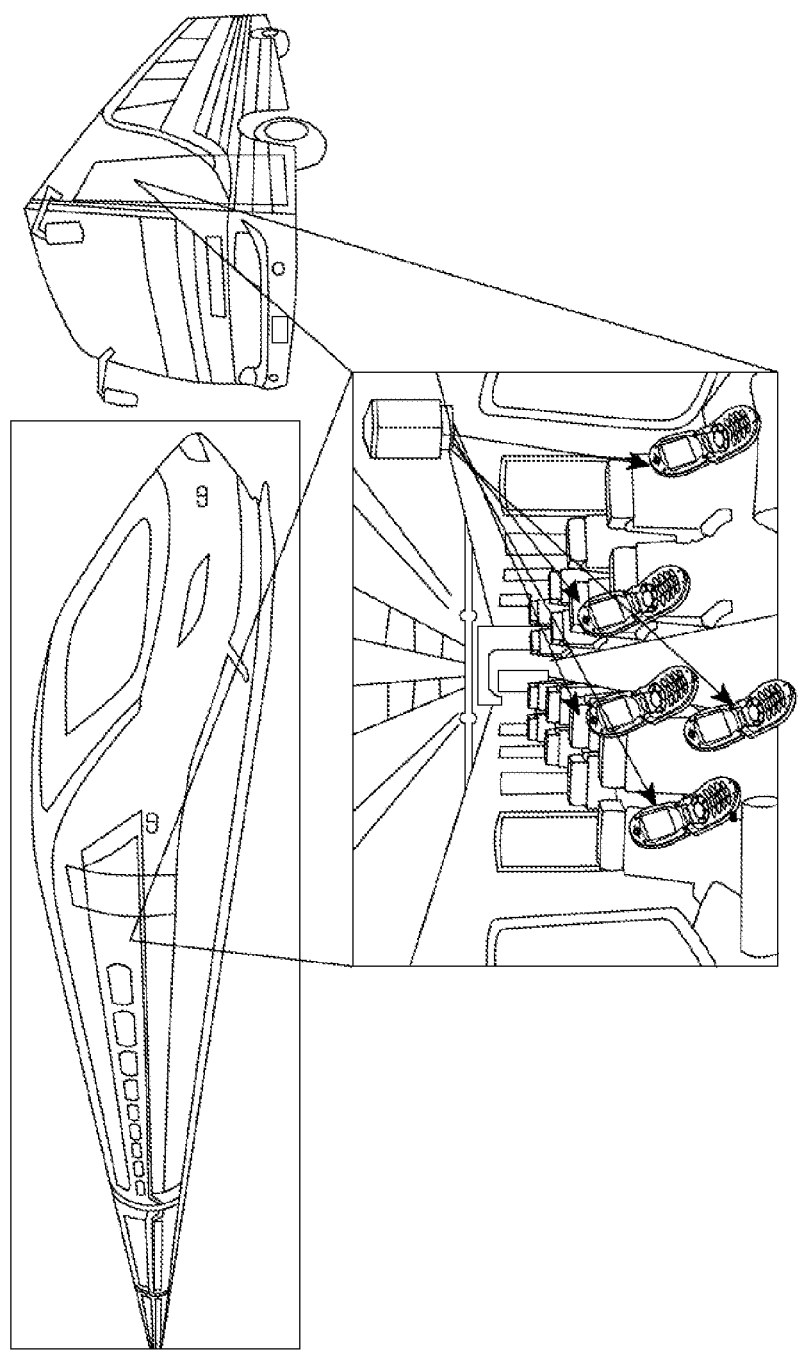
FIG. 1 illustrates a Moving Network (MN) of the related art.
Figure 2:
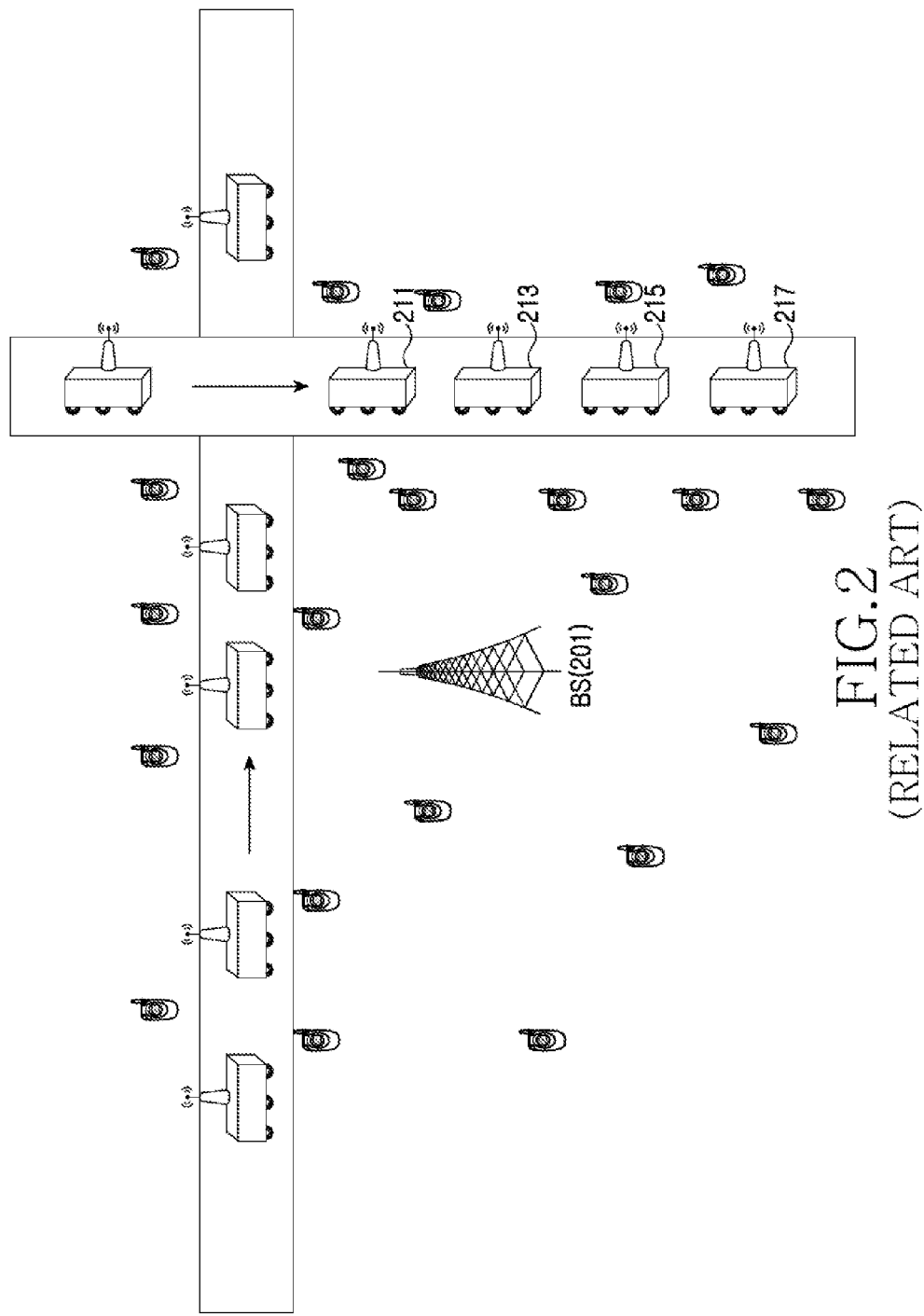
FIG. 2 illustrates a mobile communication system of the related art including MNs.
Figure 3:
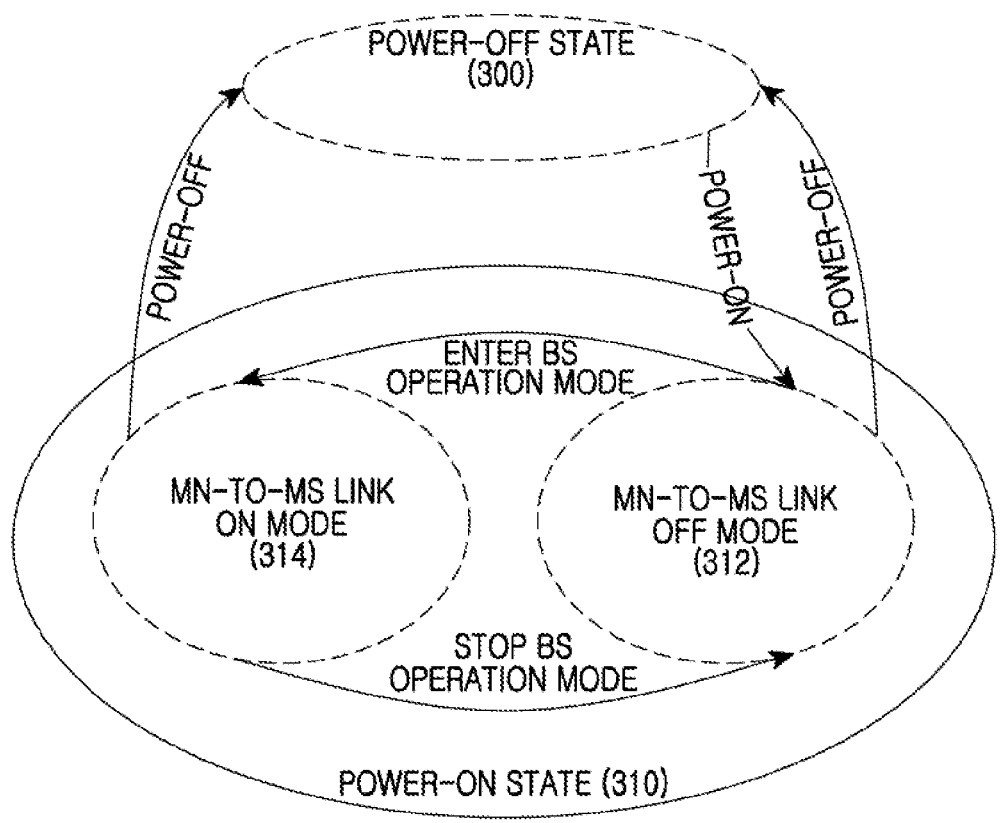
FIG. 3 illustrates operation modes of an MN in a mobile communication system according to an exemplary embodiment of the present invention.

FIG. 3 illustrates operation modes of an MN in a mobile communication system according to an exemplary embodiment of the present invention.

Referring to FIG. 3, the MN enters a Power-OFF state 300 or a Power-ON state 310 according to whether the MN (or a mobile relay station) is turned on or off. The Power-ON state 310 can be divided into an Operation On mode or MN-to-MS Link ON mode 314 and an Operation OFF mode or MN-to-MS Link OFF mode 312 according to whether or not the MN functions as a Base Station (BS).

The Operation ON mode 314 indicates a mode in which the MN serves as the BS and indicates that a link between the MN and a Mobile Station (MS) is sustained by periodically transmitting a sync channel and broadcast channel information to MSs in the service coverage area of the MN. The MN in the Operation ON mode 314 sends and receives control information to and from the BS, receives paging information of idle MSs in its service coverage area from the BS, and relays the paging information to the corresponding MS.

The Operation OFF mode 312 indicates a mode in which the MN does not serve as the BS and indicates that the transmission of the sync channel and the broadcast channel information to the MSs in the service coverage area of the MN is suspended and thus the link between the MN and the MS is absent. The MN in the Operation OFF mode 312 sends and receives the control information to and from the BS but does not relay the paging information of the idle MSs in its service coverage area. Namely, since the MN of the Operation OFF mode 312 does not service the MS, the MS traveling in the service coverage area of the MN receives the paging information directly from the BS.

Hereafter, a change of the operation mode of the MN indicates a switching between the Operation ON mode and the Operation OFF mode. Herein, when the MN changes its operation mode from the Operation ON mode to the Operation OFF mode, it needs to make any active MSs, serviced by the MN, as well as idle MSs hand over to a serving BS and reselect the cell prior to switching to the Operation OFF mode. Conversely, when changing the operation mode from the Operation OFF mode to the Operation ON mode, the MN needs to make MSs traveling in its service coverage area hand over and reselect the cell from the serving BS to the MN.

The BS can determine the operation mode of the MNs within its cell service coverage area. By grouping a plurality of MNs in a cluster, a controller may determine the operation mode of the MNs in each cluster. Hereinafter, each BS determines the operation mode of the MNs in its cell service coverage area by way of example.

Figure 4:
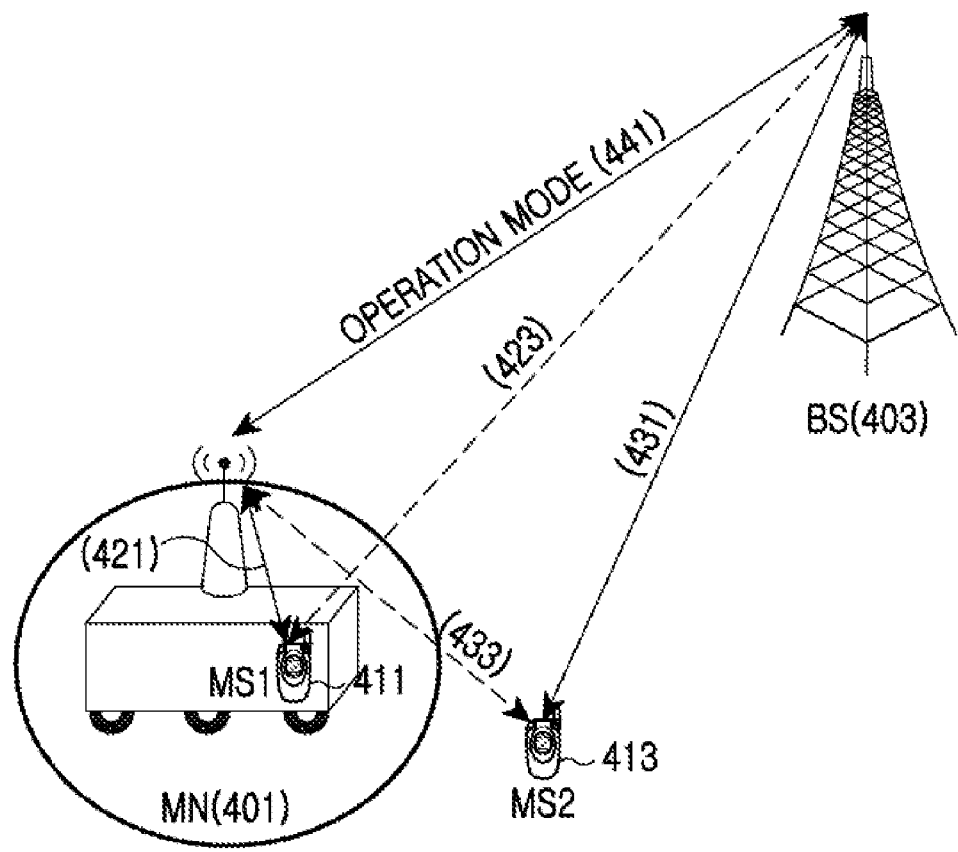
FIG. 4 illustrates an operation scenario of a mobile communication system according to an exemplary embodiment of the present invention.

FIG. 4 illustrates an operation scenario of a mobile communication system according to an exemplary embodiment of the present invention.

Referring to FIG. 4, an MS1 411 communicates by connecting to a BS 403 via the relay of an MN 401, and an MS2 413 communicates by directly connecting to the BS 403. The BS 403 may collectively determine the operation mode of not only the MN 401 but also of every MN in the cell service coverage area. Alternatively, the BS 403 may separately determine the operation mode of the MN 401.

In an exemplary method for collectively determining the operation mode of every MN in the cell service coverage area, the BS 403 collectively determines the operation mode of every MN including the MN 401 in the cell using cell information (e.g., statistical information such as traffic in the cell, total interference amount of MSs in the cell, the number of MSs in the cell, etc.), and notifies the MN 401 of the determined operation mode over a Broadcast Channel (BCH). The MN 401 maintains or changes its operation mode according to the determination by the BS 403.

For example, when the downlink 421 between the MN 401 and the MS1 411 and the downlink 431 between the BS 403 and the MS2 413 use the same resource and cause interference 423 and 433 between them, the BS 403 changes the operation mode of the MN 401 to the Operation OFF mode and notifies the MN 401 of the determined operation mode by transmission 441, thus turning off the MN 401 and mitigating the interference.

In an exemplary method for individually determining the operation mode of the MNs in the cell service coverage area, when the receive signal strength is greater than a threshold, the MS2 413 receiving the signal (e.g., preamble signal) of the MN 401 reports the receive signal strength of the MN 401 to the BS 403. The MN 401 periodically reports its speed and location information to the BS 403. The BS 403 determines the operation mode of the MN 401 by taking into account the number of MSs in the cell which report the receive signal strength of the MN 401 and the speed or location information of the MN 401, and notifies the MN 401 of the determined operation mode. The MN 401 maintains or changes its operation mode as determined by the BS 403.

For example, when the number of MSs reporting the receive signal strength of the MN 401 is greater than a threshold number and the speed of the MN 401 is less than a threshold speed, the BS 403 determines that the MN 401 exerts interference on the MSs in the cell, determines the Operation OFF mode as the operation mode of the MN 401, and notifies the MN 401 of the determined operation mode in transmission 441. Thus, the interference can be mitigated by turning off the MN 401. When the speed, periodically reported from the MN 401, is greater than the threshold speed, the BS 403 determines that the interference of the MN 401 to the MS 413 is less, determines that the MN 401 working in the Operation OFF mode should switch to the Operation ON mode, and notifies the MN 401 of the determined operation mode in step 441 so that the MN 401 can operate.

Figure 5A:
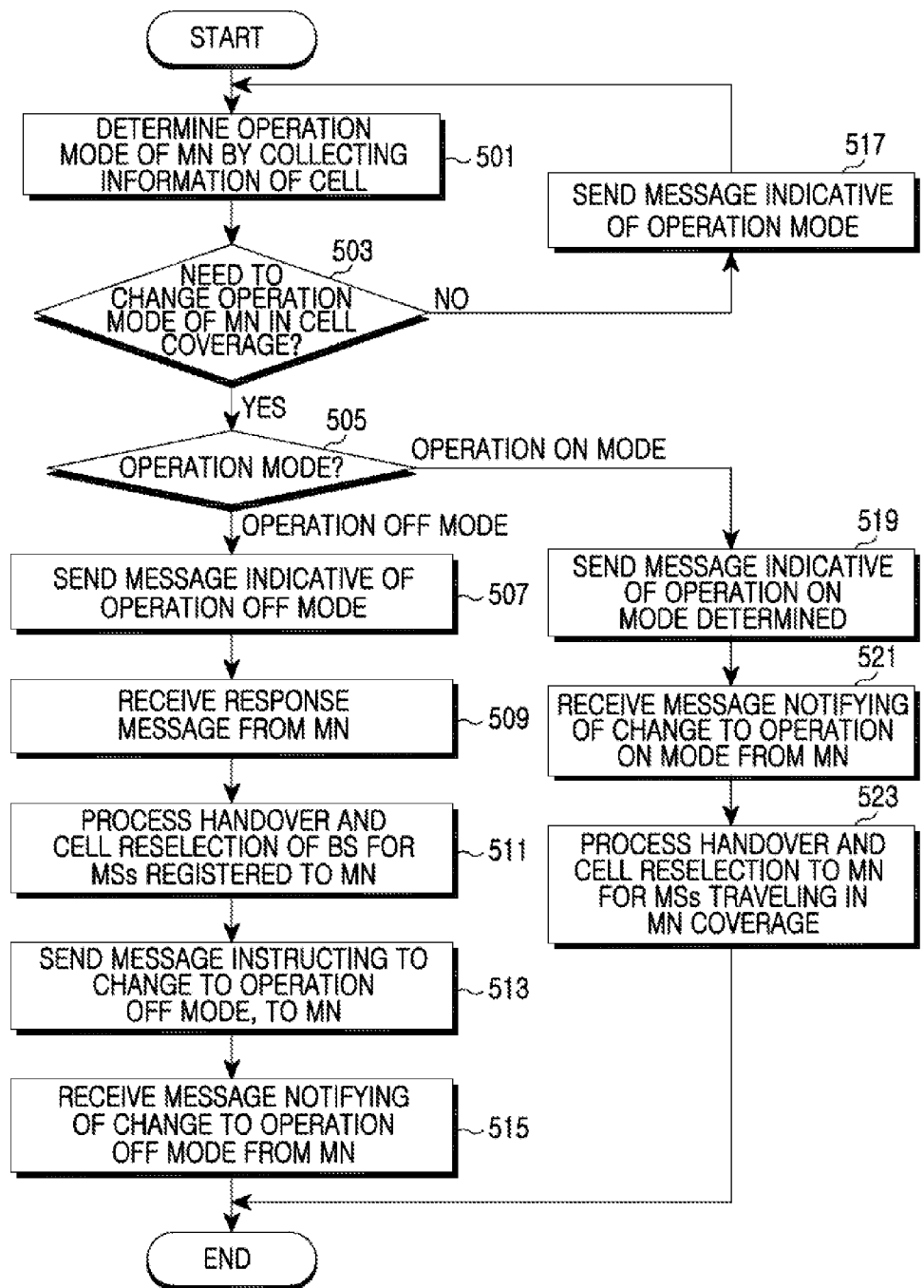
FIG. 5A is a flowchart illustrating operations of a base station in a mobile communication system according to an exemplary embodiment of the present invention.

FIG. 5A is a flowchart illustrating operations of a BS in a mobile communication system according to an exemplary embodiment of the present invention.

Referring to FIG. 5A, in step 501, the BS determines the operation mode of the MNs in the cell by collecting information in the cell. In so doing, the BS may collectively determine the operation mode of all of the MNs in the cell, or individually determine the operation mode per MN. More specifically, the BS collectively determines the operation mode of every MN in the cell by periodically collecting statistical information in the cell such as traffic in the cell, total interference amount of MSs in the cell, and number of MSs in the cell, or determines the operation mode per MN by taking into account the number of the MNs in the cell reporting the receive signal strength with respect to the MNs and the speed and location information of the MNs. Herein, the operation mode determination per MN of the BS shall be described by referring to FIG. 5B.

In step 503, the BS determines whether it is necessary to change the operation mode in the cell service coverage area based on the determined operation mode. That is, the base station determines whether the currently determined operation mode is different from the previously determined operation mode. When it is determined that there is no need to change the operation mode in the cell service coverage area, that is, when the currently determined operation mode is the same as the previously determined operation mode, the BS sends a message indicative of the operation mode in step 517. For instance, to collectively indicate the operation mode of all of the MNs in the cell, the BS periodically broadcasts the determined operation mode over the BCH and returns to step 501. Herein, the period of determining the operation mode by aggregating the information in the cell may be the same as or different from the period of broadcasting the operation mode over the BCH. When the operation mode is determined per MN in the cell, steps 503 and 517 can be omitted.

In contrast, when it is determined that it is necessary to change the operation mode in the cell service coverage area, that is, when the currently determined operation mode differs from the previously determined operation mode, the BS confirms the current operation mode in step 505.

When it is determined that the current operation mode is the Operation OFF mode, the BS sends a message indicative of the determined Operation OFF mode in step 507. For example, the BS sends the BCH indicative of the Operation OFF mode or a message MN_OMC_REQ requesting that the mode be changed to the Operation OFF mode. In step 509, the BS receives a response message MN_OMC-RSP from the MNs in the cell. In step 511, the BS processes handover and cell reselection with respect to the MSs registered to the MN. In more detail, the BS leads the MSs traveling in the service coverage area of the MN and serviced from the MN to hand over to the BS or to reselect the cell. The BS sends a message MN_OMC-IND indicative of the change to the Operation OFF mode to the MNs in step 513, receives a message MN_OMC-NOTIFY notifying of the change to the Operation OFF mode from the MNs in step 515, and then finishes this process.

When it is determined in step 505 that the current operation mode is the Operation ON mode, the BS sends a message indicative of the determined Operation ON mode in step 519. For example, the BS sends the BCH indicative of the Operation ON mode or a message MN_OMC_REQ requesting that the mode be changed to the Operation ON mode. In step 521, the BS receives a message MN_OMC-NOTIFY notifying of the changed Operation ON mode from the MNs in the cell service coverage area. In step 523, the BS processes the handover and the cell reselection with respect to the MSs registered to the BS and traveling in the service coverage area of the MN. In other words, the BS leads the MSs traveling in the service coverage area of the MN to hand over to the MN or to reselect the cell. Next, the BS finishes this process.

Figure 5B:
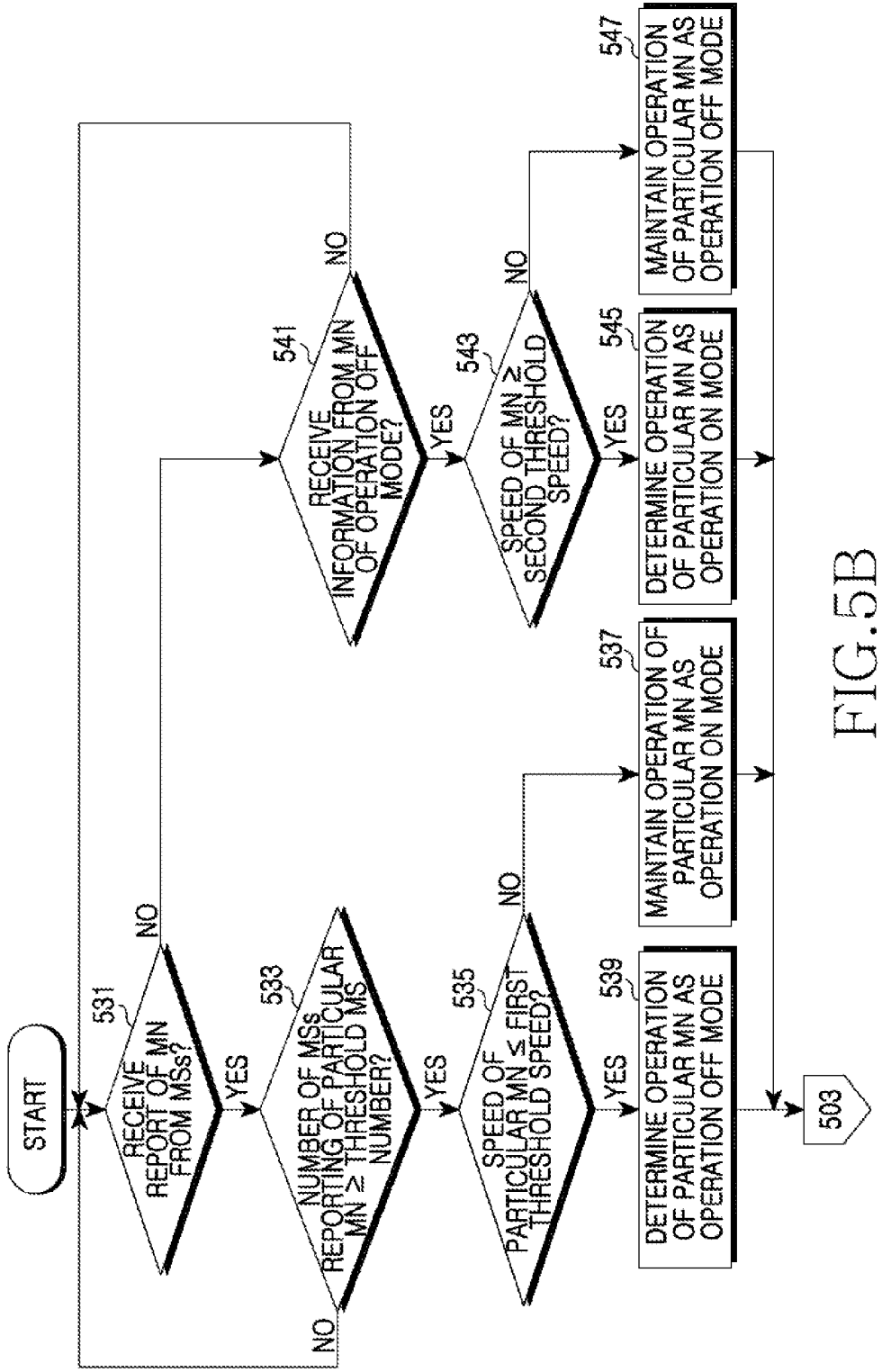
FIG. 5B illustrates operations of a base station for determining an operation mode of an MN in a mobile communication system according to an exemplary embodiment of the present invention.

FIG. 5B illustrates operations of a BS for determining an operation mode of an MN in a mobile communication system according to an exemplary embodiment of the present invention.

Referring to FIG. 5B, in step 531, the BS determines whether the report of the MN is received from the MSs in the cell. For example, the BS determines whether serviced MSs report receiving the preamble signal of the MN at a strength greater than a threshold.

Upon receiving the report of the MN from the MSs in the cell, the BS determines whether the number of the MSs reporting a particular MN is greater than or equal to a threshold MS number in step 533. That is, the BS determines whether the number of MSs which receive the preamble signal of the particular MN in the strength greater than the threshold and report the signal is greater than the threshold number. When the number of the MSs reporting the particular MN is smaller than the threshold MS number, the BS returns to step 531. When the number of the MSs reporting the particular MN is greater than or equal to the threshold MS number, the BS compares the speed of the particular MN with a first threshold speed in step 535.

When it is determined that the speed of the particular MN is greater than the first threshold speed, the BS determines the operation mode of the particular MN as the Operation ON mode in step 537 and proceeds to step 503 of FIG. 5A. More specifically, when determining that the MN interfering with the MN in the cell is moving fast in the cell service coverage area, the BS can maintain the operation mode in the Operation ON mode. In contrast, when the speed of the particular MN is less than or equal to the first threshold speed, the BS determines the operation mode of the particular MN as the Operation OFF mode in step 539 and proceeds to step 503 of FIG. 5A. If it is determined that the MN interfering in the cell is moving slowly in the cell service coverage area, the BS can change the operation mode to the Operation OFF mode. Notably, since the speed of the MN is variable, the BS may be able to determine the operation mode by additionally determining whether the speed of the MN remains greater than the first threshold speed, or less than or equal to the first threshold speed over a certain time.

Meanwhile, in step 541, the BS determines whether information is received from the MN of the Operation OFF mode among the MNs of the cell. At this time, it is assumed that the MNs of the Operation OFF mode periodically report their speed and location information to the BS.

When receiving no information from the MN of the Operation OFF mode, the BS returns to step 531. Upon receiving information from the MN of the Operation OFF mode, the BS compares the speed of the corresponding MN with a second threshold speed in step 543. Herein, the second threshold speed can be equal to or differ from the first threshold speed.

When the speed of the corresponding MN is greater than or equal to the second threshold speed, the BS determines to change the operation of the corresponding MN to the Operation ON mode in step 545 and proceeds to step 503 of FIG. 5A. In more detail, when determining that the MN interfering with the MS in the cell, and thus switching to the Operation OFF mode, is passing fast in the cell service coverage area, the BS can change the operation mode to the Operation ON mode. In contrast, when the speed of the corresponding MN is less than the second threshold speed, the BS determines to maintain the operation mode of the corresponding MN in the Operation OFF mode in step 547 and then proceeds to step 503 of FIG. 5A. In other words, when determining that the MN interfering with the MS in the cell is passing slowly in the cell service coverage area, the BS can switch the operation mode to the Operation OFF mode. Notably, since the speed of the MN is variable, the BS may be able to determine the operation mode by additionally examining whether the speed of the MN stays greater than or equal to the second threshold, or less than the second threshold over a certain time.

Figure 6:
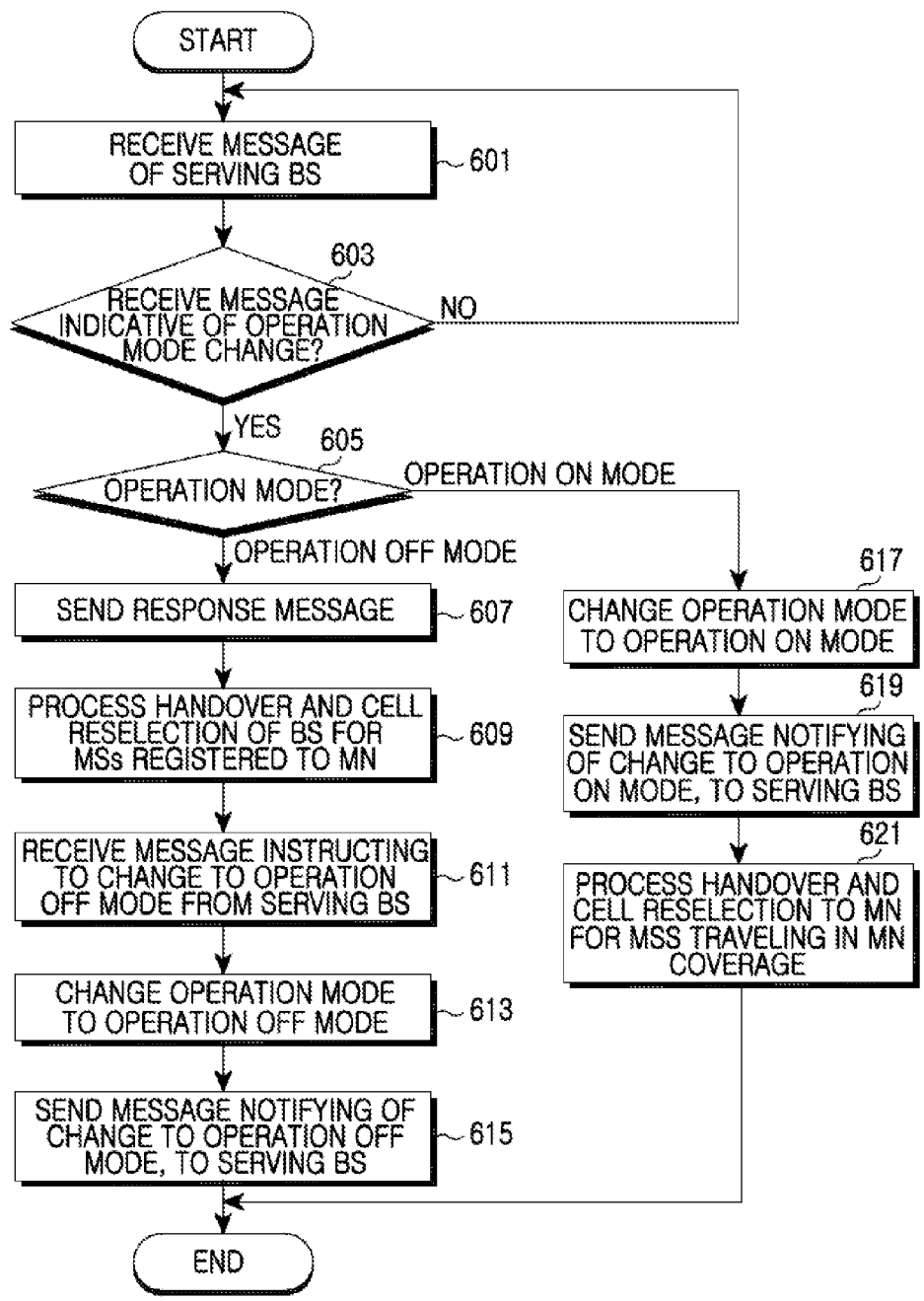
FIG. 6 illustrates operations of an MN in a mobile communication system according to an exemplary embodiment of the present invention.

FIG. 6 illustrates operations of an MN in a mobile communication system according to an exemplary embodiment of the present invention.

Referring to FIG. 6, the MN receives the message from the serving BS in step 601 and determines whether the received message includes an instruction to change the operation mode of the MN in step 603. For example, the MN may receive the BCH including the operation mode information of the MN or the message MN_OMC_REQ requesting the mode change, and determine whether the operation mode of the received message differs from its current operation mode and if it is necessary to change the operation mode. When it is determined that the operation mode of the received message is the same as the operation mode, the MN returns to step 601.

When it is determined that the operation mode of the received message differs from its operation mode and the operation mode change is necessary, the MN determines the operation mode to change in step 605.

When it is determined that the operation mode to change is the Operation OFF mode, the MN sends a response message MN_OMC-RSP to the serving BS in step 607 and processes the handover and the cell reselection with respect to the MSs registered to the MN in step 609. In more detail, the MN leads the MSs serviced by the MN to hand over to the serving BS or to reselect the cell. Next, the MN receives a message MN_OMC-IND instructing to change to the Operation OFF mode from the serving BS in step 611, changes its operation mode to the Operation OFF mode in step 613, and sends a message MN_OMC-NOTIFY informing of the changed Operation OFF mode to the serving BS in step 615. Next, the MN finishes this process.

When it is determined that the operation mode to change is the Operation ON mode, the MN switches its operation mode to the Operation ON mode in step 617 and sends a message MN_OMC-NOTIFY notifying of the changed Operation ON mode to the serving BS in step 619. In step 621, the MN processes the handover and the cell reselection with respect to the MSs registered to the serving BS and still traveling within the service coverage area of the MN. That is, the MN leads the MSs traveling in the service coverage area of the MN to hand over to the MN or to reselect the cell. Next, the MN finishes this process.

Now, various exemplary embodiments for changing an operation mode of an MN according to determination by a BS in a mobile communication system are described by referring to FIGS. 7 through 14. FIGS. 7 through 10 show the switching of an MN to an Operation OFF mode, and FIGS. 11 through 14 show the switching of an MN to an Operation ON mode.

Figure 7:
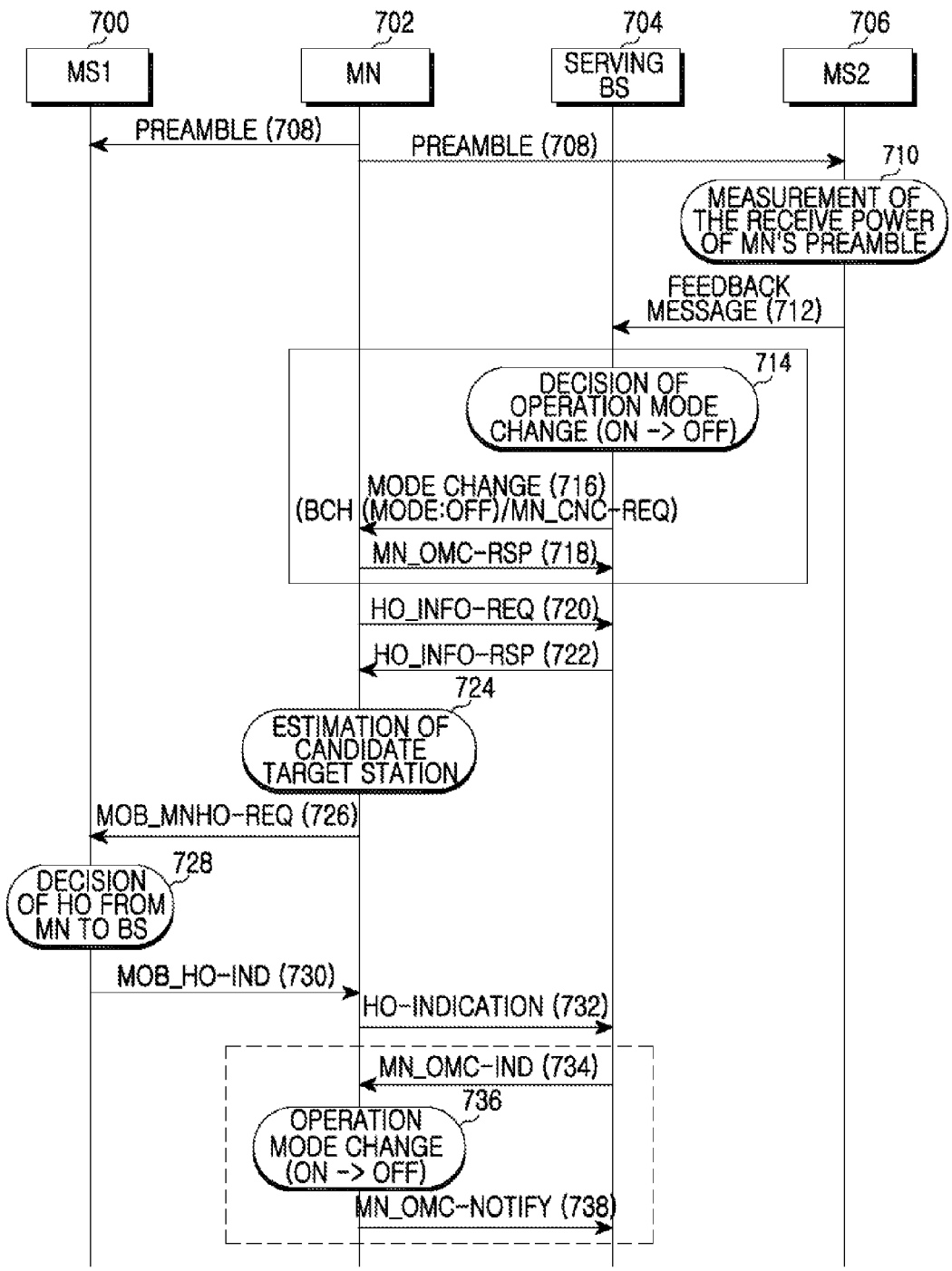
FIG. 7 illustrates signal flows when an MN is switched to an OFF mode in a mobile communication system according to an exemplary embodiment of the present invention.

FIG. 7 illustrates signal flows when the MN is switched to an OFF mode in a mobile communication system according to an exemplary embodiment of the present invention. Herein, when the operation mode of the MN is changed from the Operation ON mode to the Operation OFF mode, the MN requests the handover of the active MSs in its service coverage area.

Referring to FIG. 7, when the MN 702 in the cell service coverage area of the serving BS 704 sends the preamble in step 708, the MS2 706 serviced from the serving BS 704 measures the preamble receive power of the MN 702 in step 710. When the preamble receive power of the MN 702 is greater than a threshold, the MS2 706 sends a feedback message indicative of the measurement of the greater preamble receive power of the MN 702 to the serving BS 704 in step 712.

Using the feedback information received from the MS2 706, as well as information from the other MSs in the cell and the speed and location information of the MN 702, the serving BS 704 determines whether to change the operation mode of the MN 702 from the Operation ON mode to the Operation OFF mode in step 714. The serving BS 704 may determine to change the operation mode of the MNs in the service coverage area of the serving BS from the Operation ON mode to the Operation OFF mode using the statistical information of the cell service coverage area. In step 716, the serving BS 704 sends a message indicative of the operation mode change of the MN to the MN 702 or to every MN. For instance, the serving BS 704 sends the message MN_OMC_REQ to the MN 702 requesting that the mode be changed to the Operation OFF mode, or sends the BCH indicative of the Operation OFF mode to every MN in the cell service coverage area over the BCH transmission interval.

Upon receiving the message indicative of the Operation OFF mode during the Operation ON mode operation, the MN 702 sends a response message MN_OMC-RSP to the serving BS 704 in step 718.

Next, the MN 702 sends a message HO_INFO-REQ requesting the handover information to the serving BS 704 for the handover of the active MSs in the service coverage area of the MN in step 720, and receives a response message HO_INFO-RSP including the requested handover information from the serving BS 704 in step 722. Herein, the message HO_INFO-REQ requesting the handover information requests information of candidate BSs which can be handover targets of the active MSs.

The MN 702 determines candidate target BSs to which the active MSs are to hand over in step 724 and sends a message MOB_MNHO-REQ requesting the handover to the active MSs (e.g., MS1 700) in step 726.

The active MSs (e.g., MS1 700) receiving the message requesting to hand over determine the handover target BS as the serving BS in step 728 and send a message MOB_HO-IND informing of the handover to the serving BS, to the MN 702 in step 730. The MN 702 sends a message HO-indication indicative of the handover of the active MSs 700 to the serving BS 704 in step 732.

In step 734, the serving BS 704 sends a message MN_OMC-IND, instructing to change the operation mode, to the MN 702. The MN 702 receiving the message changes its operation mode from the Operation ON mode to the Operation OFF mode in step 736 and sends a message MN_OMC-NOTIFY notifying that the operation mode has changed, to the serving BS 704 in step 738.

Figure 8:
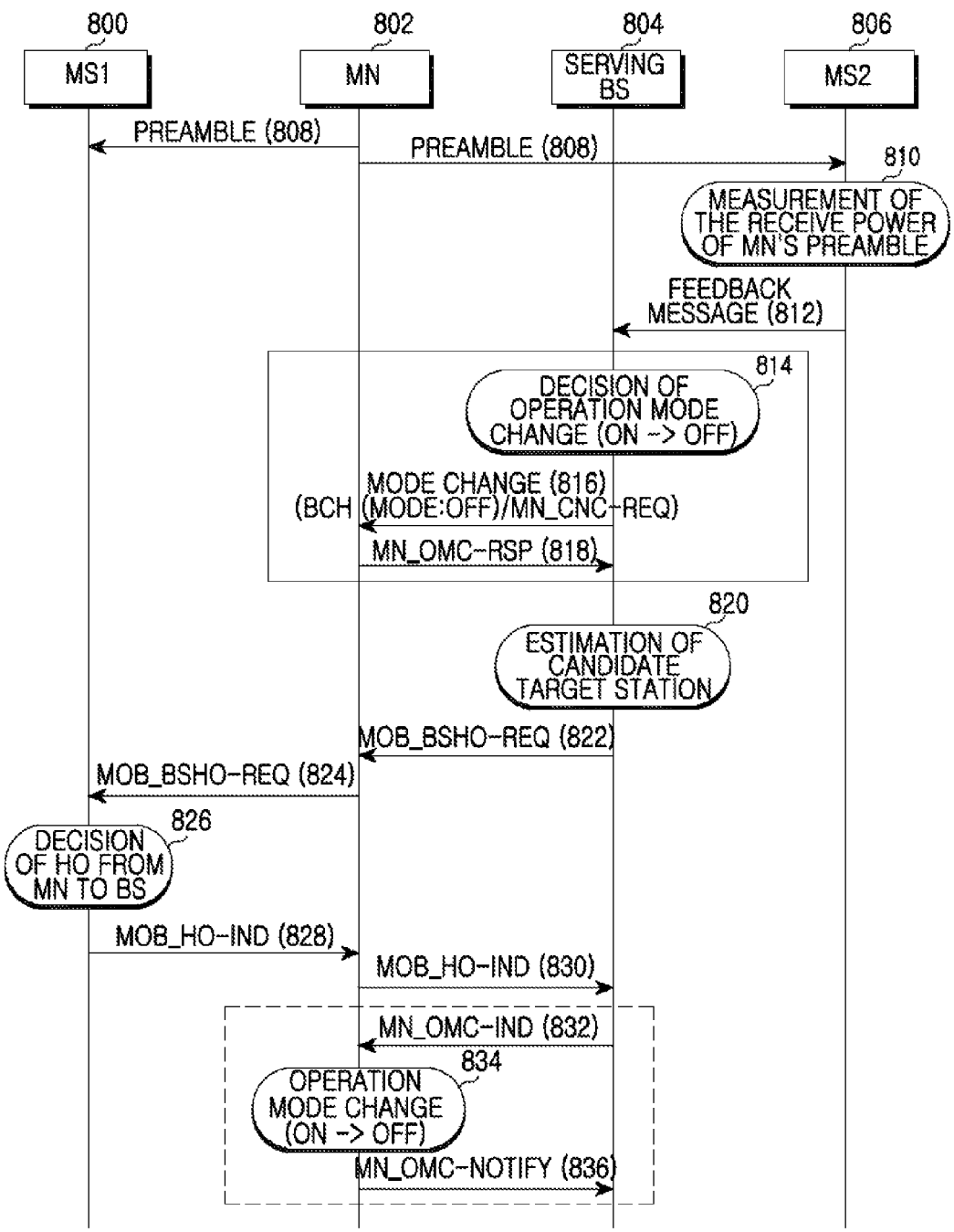
FIG. 8 illustrates signal flows when an MN is switched to an OFF mode in a mobile communication system according to an exemplary embodiment of the present invention.

FIG. 8 illustrates signal flows when an MN is switched to an OFF mode in a mobile communication system according to an exemplary embodiment of the present invention. Herein, when the operation mode of the MN is changed from the Operation ON mode to the Operation OFF mode, the serving BS requests the handover of the active MSs traveling in the service coverage area of the MN.

Referring to FIG. 8, steps 808 through 818 relating to the messages transmitted and received to switch the MN 802 to the Operation OFF mode as determined by the serving BS 804 are substantially the same as steps 708 through 718 of FIG. 7, and thus their explanations shall be omitted.

The serving BS 804, receiving the response message MN_OMC-RSP from the MN 802 with respect to the operation mode change, determines candidate target BSs to which the active MSs are to hand over, for the handover of the active MSs of the MN service coverage area in step 820 and sends a message MOB_BSHO-REQ requesting the handover to the active MSs (e.g., MS1 800) via the MN 802 in steps 822 and 824.

The MSs 800, receiving the message requesting to hand over, determine the handover target BS as the serving BS in step 826 and send a message MOB_HO-IND informing of the handover to the serving BS, to the serving BS 804 via the MN 802 in steps 828 and 830.

In step 832, the serving BS 804 sends a message MN_OMC-IND, instructing to change the operation mode, to the MN 802. The MN 802 receiving the message changes its operation mode from the Operation ON mode to the Operation OFF mode in step 834 and sends the message MN_OMC-NOTIFY notifying of the operation mode changed, to the serving BS 804 in step 836.

Figure 9:
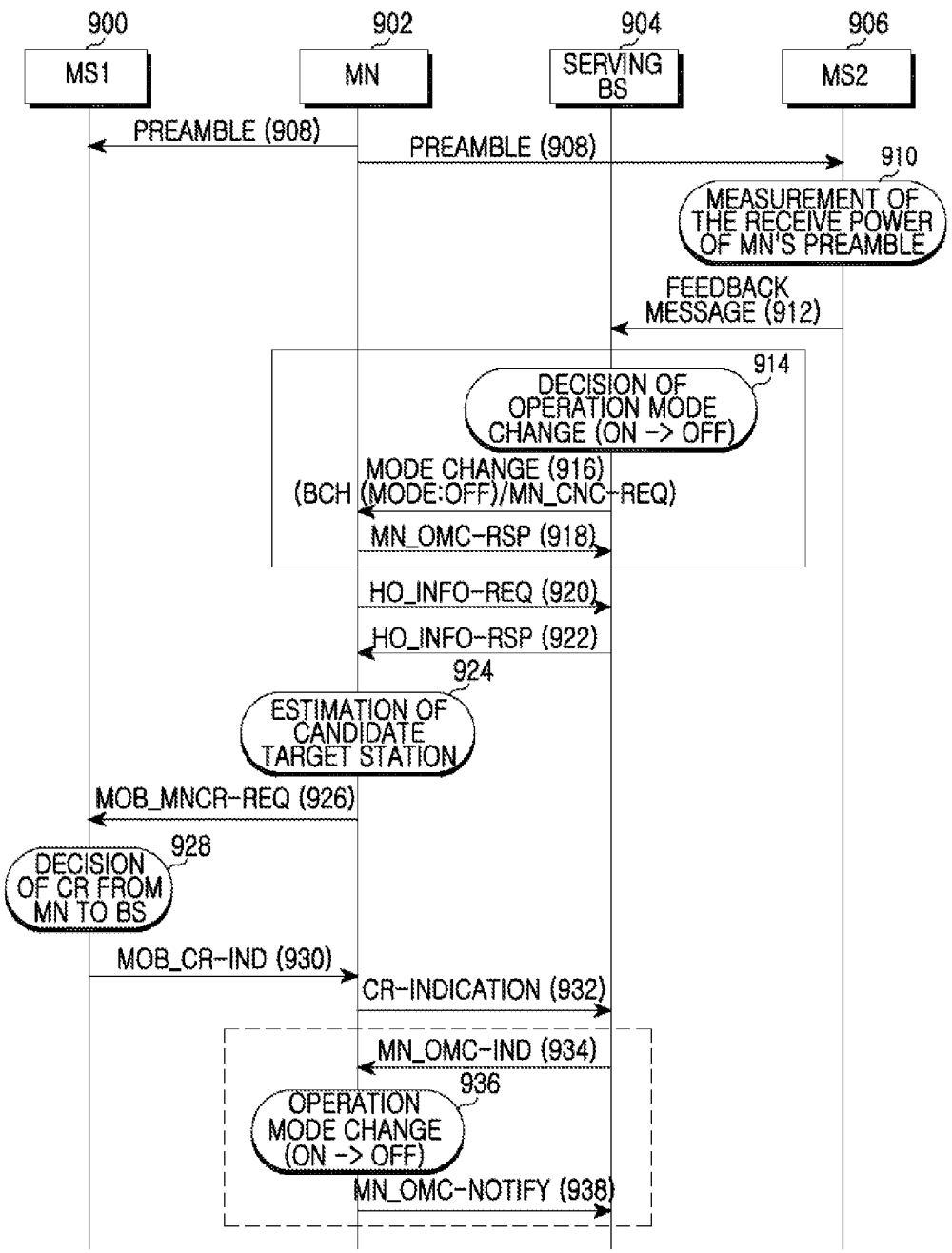
FIG. 9 illustrates signal flows when an MN is switched to an OFF mode in a mobile communication system according to an exemplary embodiment of the present invention.

FIG. 9 illustrates signal flows when an MN is switched to an OFF mode in a mobile communication system according to an exemplary embodiment of the present invention. Herein, when the operation mode of the MN is changed from the Operation ON mode to the Operation OFF mode, the MN requests the cell reselection of idle MSs traveling in its service coverage area.

Referring to FIG. 9, steps 908 through 918 relating to the messages transmitted and received to switch the MN 902 to the Operation OFF mode as determined by the serving BS 904 are substantially the same as steps 708 through 718 of FIG. 7, and thus their explanations shall be omitted.

The MN 902, after sending the response message MN_OMC-RSP to the serving BS 904 in relation to the operation mode change, sends a message CR_INFO-REQ requesting cell reselection information to the serving BS 904 for the cell reselection of the idle MSs in the service coverage area of the MN in step 920, and receives a response message CR_INFO-RSP including the requested cell reselection information from the serving BS 904 in step 922.

The MN 902 determines candidate target BSs for which the idle MSs can reselect the cell in step 924, and sends a message MOB_MNCR-REQ requesting the cell reselect to the idle MSs (e.g., MS1 900) in step 926.

The MSs 900, receiving the message requesting to reselect the cell, determine the target BS of the cell reselection as the serving BS in step 928 and send a message MOB_CR-IND informing of the cell reselection to the serving BS, to the MN 902 in step 930. The MN 902 sends a message CR-indication indicative of the cell reselection of the idle MSs 900 to the serving BS 904 in step 932.

Next, the serving BS 904 sends the message MN_OMC-IND instructing to change the operation mode, to the MN 902 in step 934. The MN 902 receiving the message changes its operation mode from the Operation ON mode to the Operation OFF mode in step 936 and sends the message MN_OMC-NOTIFY notifying of the operation mode changed, to the serving BS 904 in step 938.

Figure 10:
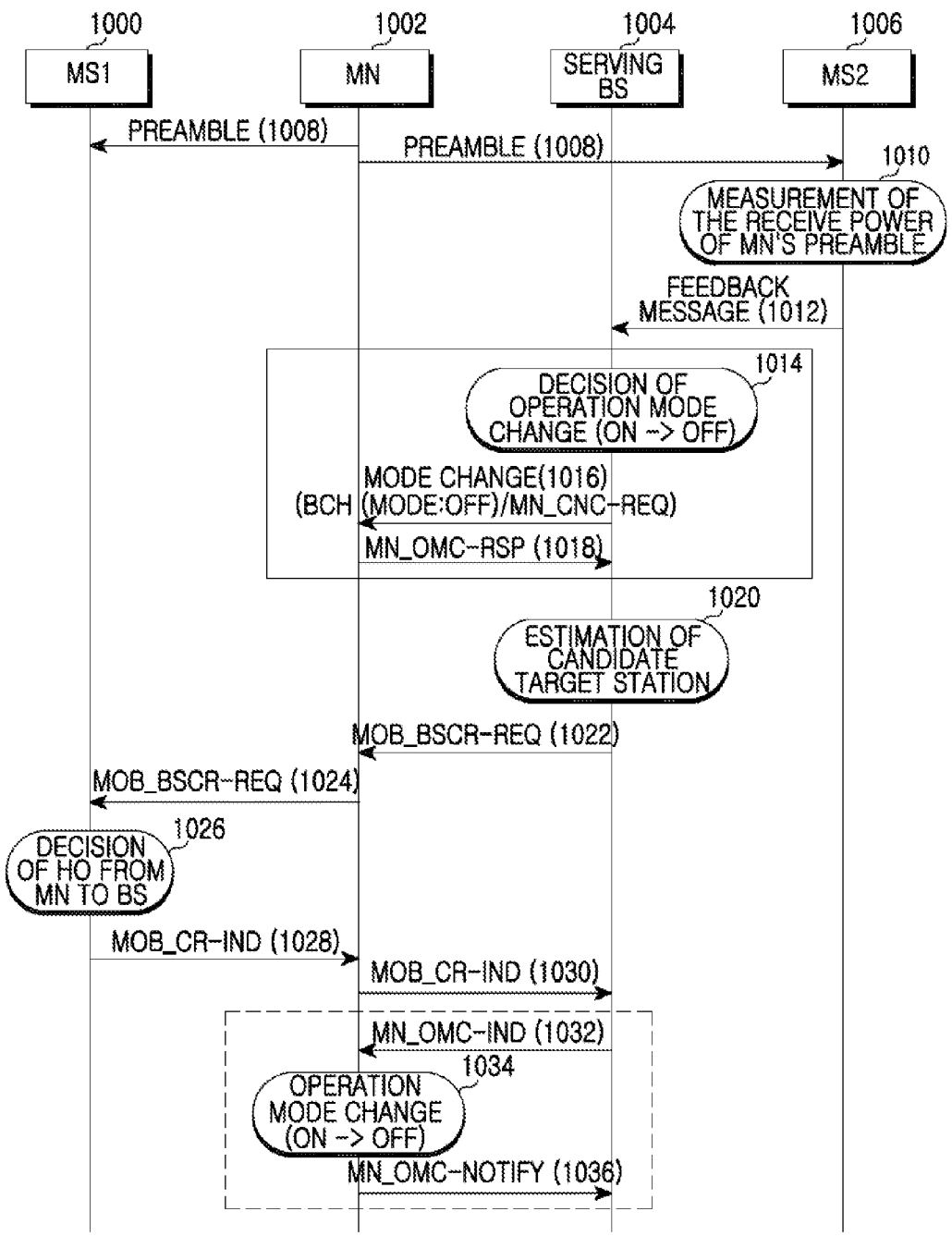
FIG. 10 illustrates signal flows when an MN is switched to an OFF mode in a mobile communication system according to an exemplary embodiment of the present invention.

FIG. 10 illustrates signal flows when an MN is switched to an OFF mode in a mobile communication system according to an exemplary embodiment of the present invention. Herein, when the operation mode of the MN is changed from the Operation ON mode to the Operation OFF mode, the serving BS requests the cell reselection of idle MSs traveling in the MN service coverage area.

Referring to FIG. 10, steps 1008 through 1018 relating to the messages transmitted and received to switch the MN 1002 to the Operation OFF mode as determined by the serving BS 1004 are substantially the same as steps 708 through 718 of FIG. 7, and thus their explanations shall be omitted.

Upon receiving the response message MN_OMC-RSP for the operation mode change from the MN 1002, the serving BS 1004 determines candidate target BSs for which the idle MSs can reselect the cell, for the cell reselection of the idle MSs in the service coverage area of the MN in step 1020, and sends a message MOB_BSCR-REQ requesting the cell reselect to the idle MSs 1000 via the MN 1002 in steps 1022 and 1024.

The MSs 1000 receiving the message requesting to reselect the cell, determine the target BS of the cell reselection as the serving BS in step 1026 and send the message MOB_CR-IND informing of the cell reselection to the serving BS, to the serving BS 1004 via the MN 1002 in steps 1028 and 1030.

Next, the serving BS 1004 sends the message MN_OMC-IND instructing to change the operation mode, to the MN 1002 in step 1032. The MN 1002 receiving the message changes its operation mode from the Operation ON mode to the Operation OFF mode in step 1034 and sends the message MN_OMC-NOTIFY notifying of the operation mode changed, to the serving BS 1004 in step 1036.

Figure 11:
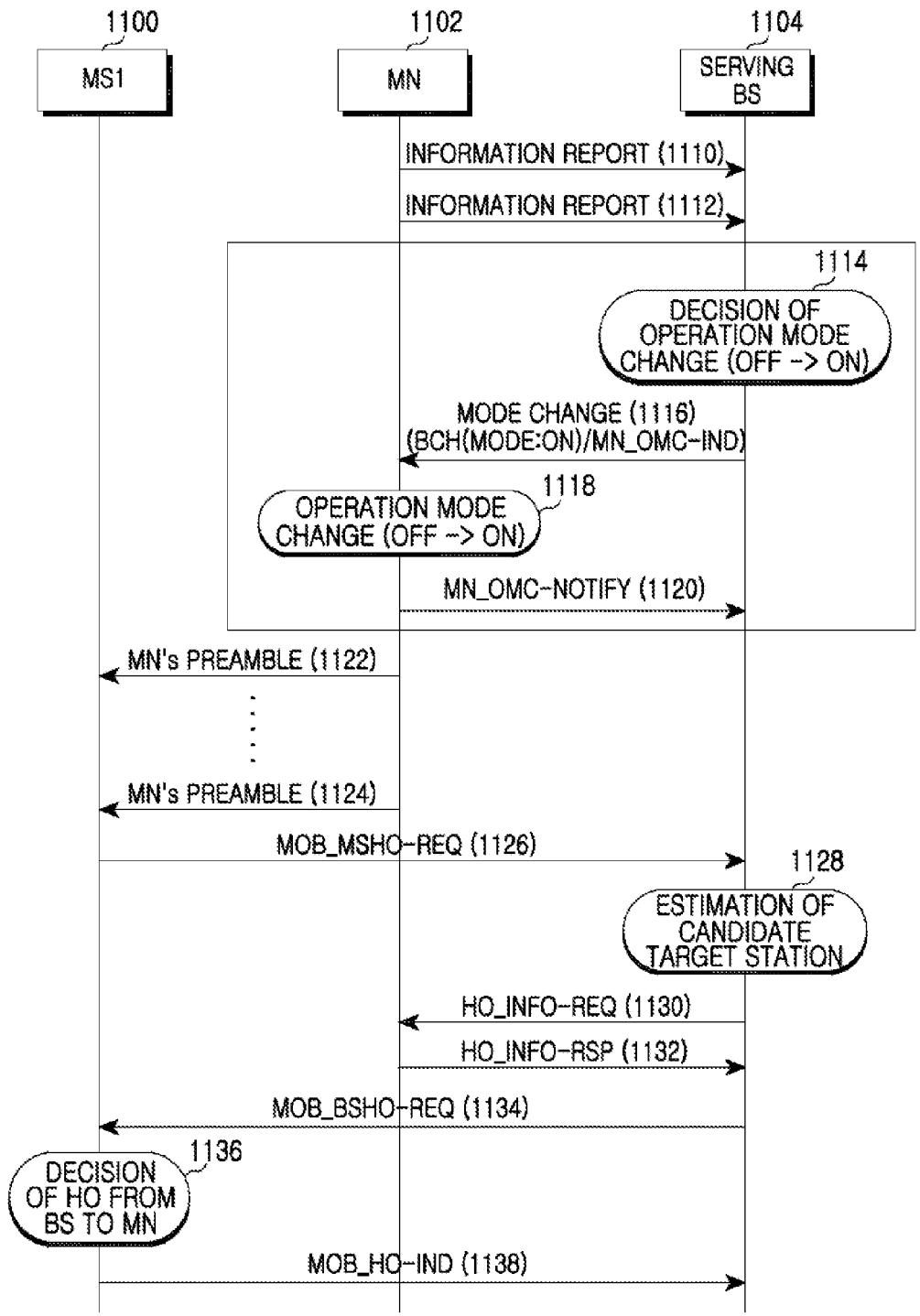
FIG. 11 illustrates signal flows when an MN is switched to an ON mode in a mobile communication system according to an exemplary embodiment of the present invention.

FIG. 11 illustrates signal flows when an MN is switched to an ON mode in a mobile communication system according to an exemplary embodiment of the present invention. Herein, when the operation mode of the MN is changed from the Operation OFF mode to the Operation ON mode, the active MSs traveling in the MN service coverage area but serviced by the serving BS request the handover.

Referring to FIG. 11, the MN 1102, having an Operation OFF mode in the cell service coverage area of the serving BS 1104, periodically transmits its speed and location information to the serving BS 1104 in steps 1110 and 1112.

In step 1114, the serving BS 1104 determines the operation mode of the corresponding MN 1102 as the Operation ON mode using the location or speed information of the MN 1102. The serving BS 1104 may determine to change the operation mode of the MNs in the service coverage area of the serving BS from the Operation OFF mode to the Operation ON mode, by using the statistical information of the cell service coverage area. The serving BS 1104 sends the message indicative of the operation mode change of the MN to the MN 1102 or every MN in step 1116. For example, the serving BS 1104 sends the message MN_OMC_IND requesting the mode change to the Operation ON mode to the MN 1102, or sends the BCH indicative of the Operation ON mode to all of the MNs in the cell service coverage area over the BCH transmission interval.

When receiving the message indicative of the Operation ON mode while operating in the Operation OFF mode, the MN 1102 switches its operation mode to the Operation ON mode in step 1118 and sends the message MN_OMC-NOTIFY, notifying of the operation mode change, to the serving BS 1104 in step 1120.

In steps 1122 and 1124, the MN 1102 switching to the Operation ON mode transmits the sync channel information, such as a preamble, in every frame. At this time, upon receiving the preamble from the MN 1102, the active MS 1100, which travels in the service coverage area of the MN 1102 and is serviced by the serving BS 1104, determines whether the receive power of the preamble is greater than a preset threshold. When it is determined that the preamble receive power is greater than the threshold, the active MS 1100 sends a handover request message MOB_MSHO-REQ to the serving BS 1104 in step 1126. Herein, the handover request message MOB_MSHO-REQ is transmitted to request the handover to the serving BS 1104 when the MS 1100 searches a neighbor node having a better signal strength than the serving BS 1104 currently providing service or when the MS 1100 detects a neighbor node available for the handover based on the preset threshold.

Next, the serving BS 1104 determines the handover of the MS 1100 to the MN 1102 in step 1128, sends a message HO_INFO-REQ requesting handover related information to the MN 1102 in step 1130, and receives a response message HO_INFO-RSP including the handover related information in step 1132. That is, the serving BS 1104 and the MN 1102 exchange the information of the active MSs traveling in the service coverage area of the MN 1102 in steps 1130 and 1132.

The serving BS 1104 sends a response message MOB_B-SHO-RSP for the handover request to the active MS 1100 in step 1134. The active MS (e.g., MS1 1100) determines to hand over from the serving BS 1104 to the MN 1102 in step 1136 and sends a message MOB_HO-IND notifying of the handover determination to the MN 1102, to the serving BS 1104 in step 1138.

Figure 12:
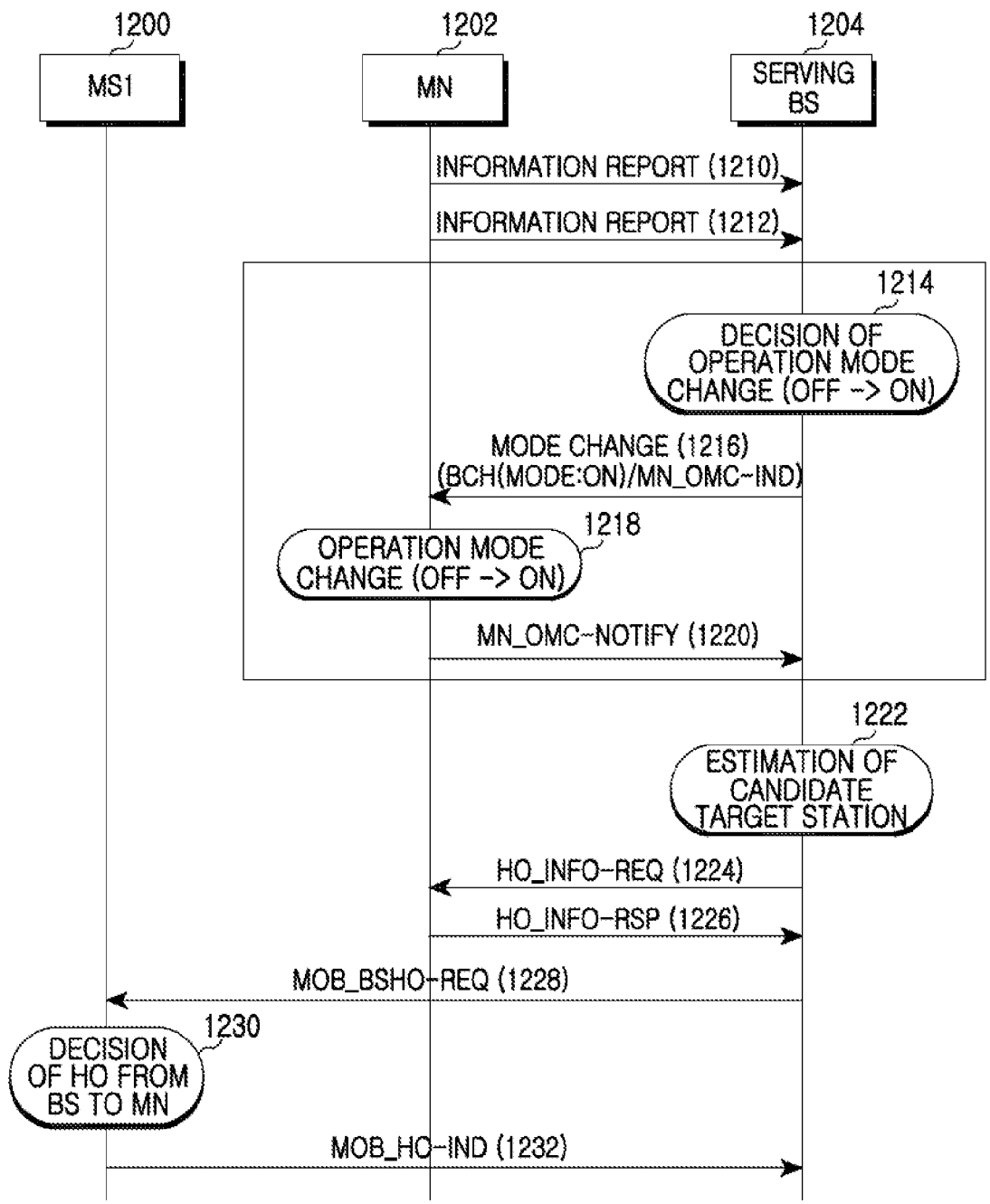
FIG. 12 illustrates signal flows when an MN is switched to an ON mode in a mobile communication system according to an exemplary embodiment of the present invention.

FIG. 12 illustrates signal flows when an MN is switched to an ON mode in a mobile communication system according to an exemplary embodiment of the present invention. Herein, when the operation mode of the MN is switched from the Operation OFF mode to the Operation ON mode, the serving BS requests the handover of the active MSs which travel in the MN service coverage area but are serviced from the serving BS.

Referring to FIG. 12, steps 1210 through 1220 for switching the MN 1202 to the Operation ON mode as determined by the serving BS 1204 are substantially the same as the steps 1110 through 1120 of FIG. 11, and thus their descriptions shall be omitted here.

The serving BS 1204 receiving the message MN_OMC-NOTIFY notifying of the changed operation mode from the MN 1202, determines the handover to the MN 1202 of the MS 1200 traveling in the service coverage area of the MN 1202 in step 1222, sends a message HO_INFO-REQ requesting handover related information to the MN 1202 in step 1224, and receives a response HO_INFO-RSP including the handover related information in step 1226. That is, the serving BS 1204 and the MN 1202 exchange the information of the active MSs in the service coverage area of the MN 1202.

In step 1228, the serving BS 1204 sends a handover request message MOB_BSHO-REQ to the active MS 1200. The active MS 1200 determines to hand over from the serving BS 1204 to the MN 1202 in step 1230 and sends a message MOB_HO-IND notifying of the determined handover to the MN 1202, to the serving BS 1204 in step 1232.

Figure 13:
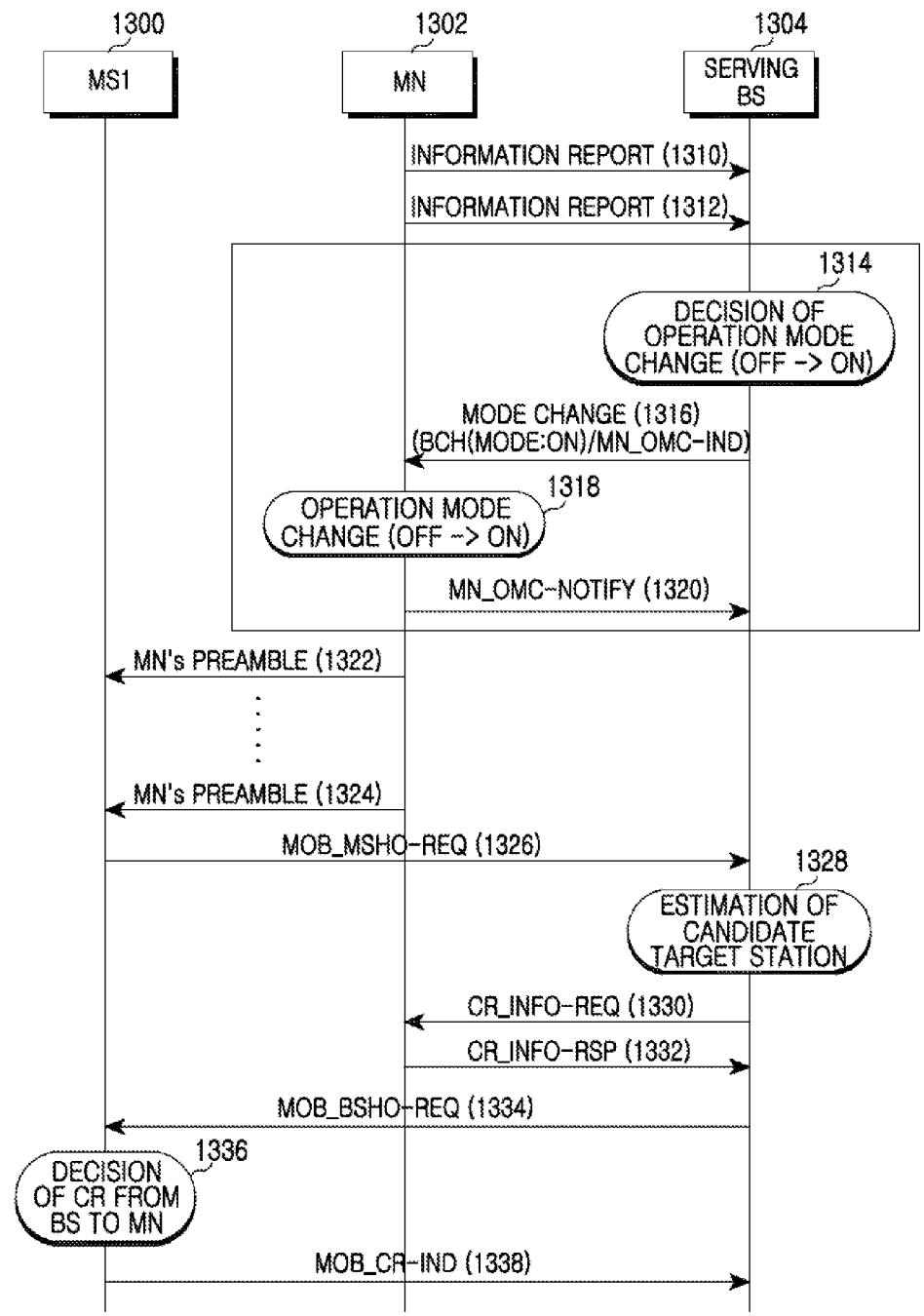
FIG. 13 illustrates signal flows when an MN is switched to an ON mode in a mobile communication system according to an exemplary embodiment of the present invention.

FIG. 13 illustrates signal flows when an MN is switched to an ON mode in a mobile communication system according to an exemplary embodiment of the present invention. Herein, when the operation mode of the MN is switched from the Operation OFF mode to the Operation ON mode, the idle MSs traveling in the MN service coverage area but camping at the serving BS request the cell reselection.

Referring to FIG. 13, steps 1310 through 1320 for switching the MN 1302 to the Operation ON mode as determined by the serving BS 1304 are substantially the same as the steps 1110 through 1120 of FIG. 11, and thus their descriptions shall be omitted here.

In steps 1322 and 1324, the MN 1302 switching to the Operation ON mode transmits the sync channel information such as a preamble in every frame. Upon receiving the preamble from the MN 1302, the idle MS 1300 traveling in the service coverage area of the MN 1302 and serviced from the serving BS 1304 determines whether the receive power of the preamble is greater than a threshold. When the preamble receive power exceeds the threshold, the idle MS 1300 sends a cell reselection request message MOB_MSCR-REQ to the serving BS 1304 in step 1326.

The serving BS 1304 determines that the MS 1300 performs the cell reselection to the MN 1302 in step 1328, sends a message CR_INFO-REQ requesting cell reselection related information to the MN 1302 in step 1330, and receives a response message CR_INFO-RSP including the cell reselection related information in step 1332. That is, the serving BS 1304 and the MN 1302 exchange the information of the idle MSs in the service coverage area of the MN 1302.

The serving BS 1304 sends a response message MOB_BSCR-RSP for the cell reselection request to the idle MS 1300 in step 1334. The idle MS 1300 determines to conduct the cell reselection from the serving BS 1304 to the MN 1302 in step 1336, and sends a message MOB_CR-IND notifying of the cell reselection to the MN 1302, to the serving BS 1304 in step 1338.

Figure 14:
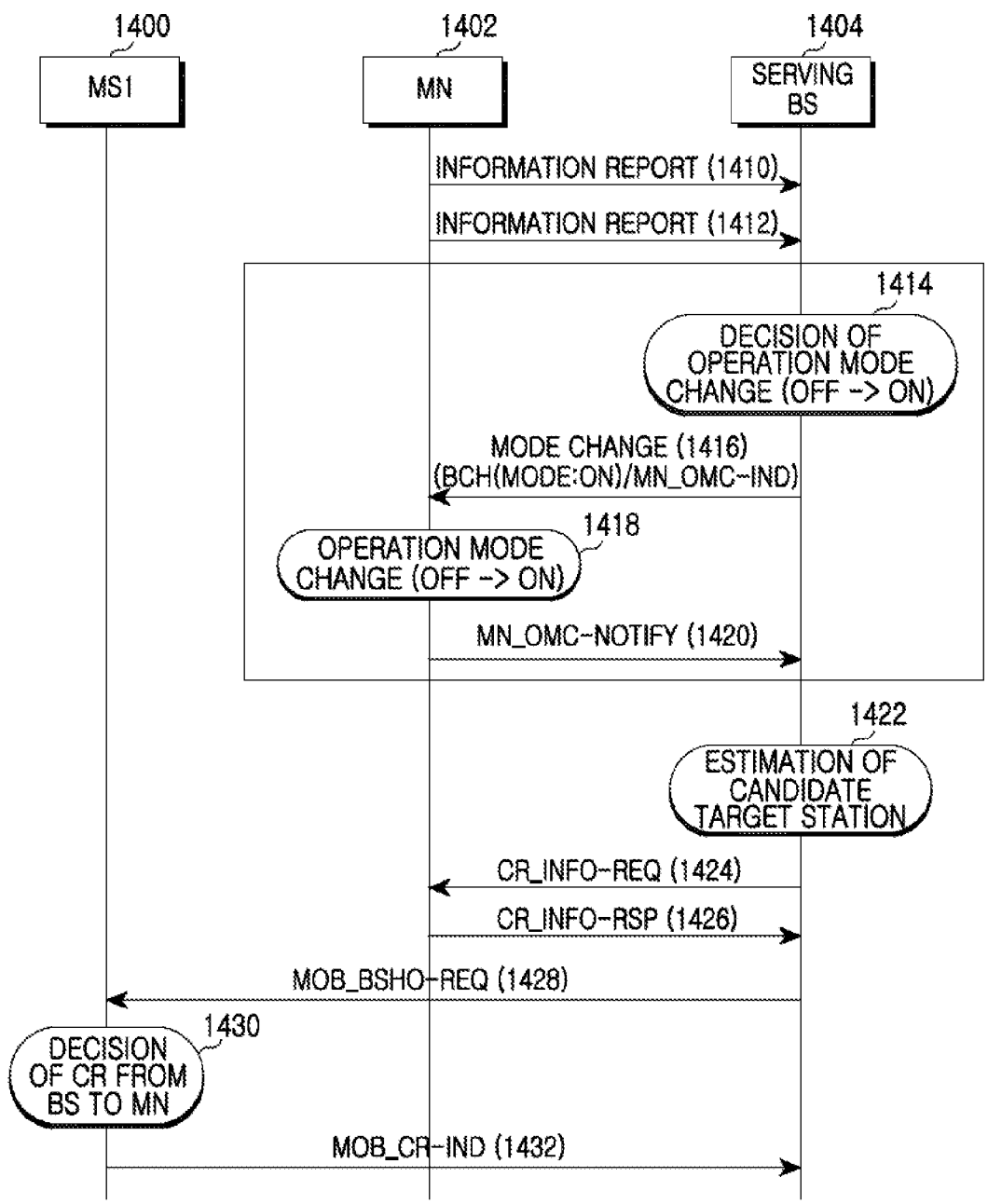
FIG. 14 illustrates signal flows when an MN is switched to an ON mode in a mobile communication system according to an exemplary embodiment of the present invention.

FIG. 14 illustrates signal flows when an MN is switched to an ON mode in a mobile communication system according to an exemplary embodiment of the present invention. Herein, when the operation mode of the MN is switched from the Operation OFF mode to the Operation ON mode, the serving BS requests the cell reselection of the idle MSs traveling in the MN service coverage area but camping at the serving BS.

Referring to FIG. 14, steps 1410 through 1420 for switching the MN 1402 to the Operation ON mode as determined by the serving BS 1404 are substantially the same as the steps 1110 through 1120 of FIG. 11, and thus their descriptions shall be omitted here.

Upon receiving the message MN_OMC-NOTIFY notifying of the changed operation mode from the MN 1402, the serving BS 1404 determines that the MS 1400 traveling in the service coverage area of the MN 1402 performs the cell reselection to the MN 1402 in step 1422, sends a message CR_INFO-REQ requesting cell reselection related information to the MN 1402 in step 1424, and receives a response message CR_INFO-RSP including the cell reselection related information in step 1426. That is, the serving BS 1404 and the MN 1402 exchange the information of the idle MSs in the service coverage area of the MN 1402.

The serving BS 1404 sends a cell reselection request message MOB_BSCR-REQ to the idle MS 1400 in step 1428. The idle MS 1400 determines to conduct the cell reselection from the serving BS 1404 to the MN 1402 in step 1430, and sends a message MOB_CR-IND notifying of the determined cell reselection to the MN 1402, to the serving BS 1404 in step 1432.

Figure 15:
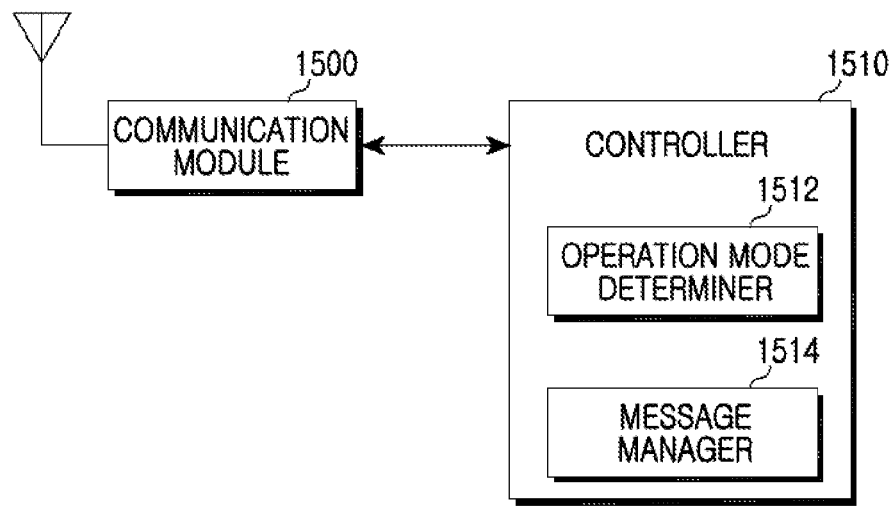
FIG. 15 illustrates a base station in a mobile communication system according to an exemplary embodiment of the present invention.

FIG. 15 is a block diagram of a BS in a mobile communication system according to an exemplary embodiment of the present invention.

Referring to FIG. 15, the BS includes a communication module 1500 and a controller 1510. The controller 1510 includes an operation mode determiner 1512 and a message manager 1514.

The communication module 1500 processes the signals transmitted and received to and from the MS or the MN under the control of the controller 1510. In more detail, the communication module 1500 processes a baseband signal output from the controller 1500 to a Radio Frequency (RF) signal and sends the RF signal to the MS or the MN. The communication module 1500 processes an RF signal received from the MS or the MN to a baseband signal and outputs the baseband signal to the controller 1510.

The controller 1510 controls and processes the operations of the BS. By including the operation mode determiner 1512, the controller 1510 collectively determines the operation mode of every MN in the cell service coverage area, or determines the operation mode per MN in the cell service coverage area. More specifically, the operation mode determiner 1512 collectively determines the operation mode of the MNs in the cell by aggregating the statistical information of the cell service coverage area by periods, or individually determines the operation mode of a particular MN using the number of the MSs reporting the receive signal strength of the particular MN and the speed or location information of the particular MN. Herein, the statistical information of the cell service coverage area indicates the cell traffic amount, the total interference amount of the MSs in the cell, and the number of MSs in the cell. The controller 1510 includes the message manager 1514 for analyzing and processing various messages transmitted and received, controlling and processing the functions to generate and send the message including the determined operation mode, and generating and analyzing the message required for the operation mode change of the MN. For example, the message manager 1514 can generate the BCH indicative of the operation mode of the MN, or the message (e.g., MN_OMC-REQ or MN_OMC-IND) requesting the operation mode change.

When the MN needs to switch from the Operation ON mode to the Operation OFF mode, the controller 1510 controls and processes the function so that the active MS and the idle MSs serviced from the MN carry out the handover and the cell reselection to the serving BS before the MN enters the Operation OFF mode. Conversely, when the MN needs to switch from the Operation OFF mode to the Operation ON mode, the controller 1510 controls and processes the function so that the MSs in the service coverage area of the MN carry out the handover and the cell reselection from the serving BS to the MN after the MN enters the Operation ON mode.

Figure 16:
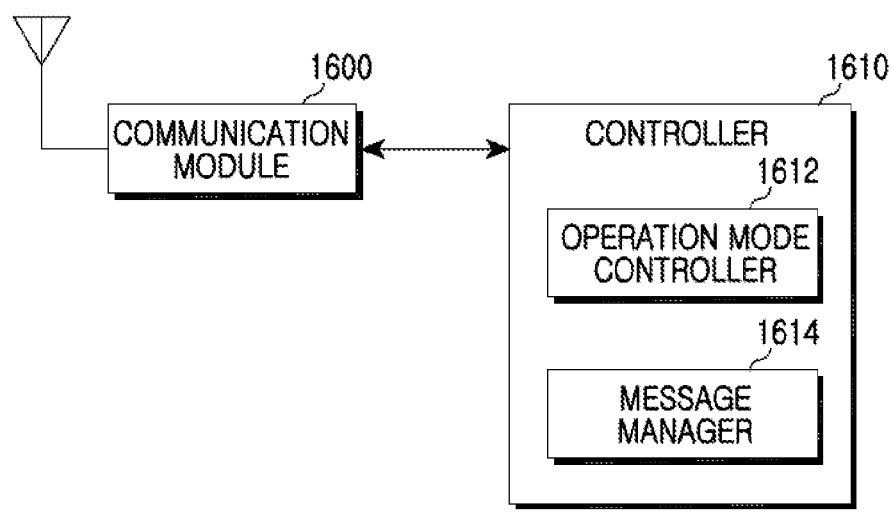
FIG. 16 illustrates an MN in a mobile communication system according to an exemplary embodiment of the present invention.

FIG. 16 is a block diagram of an MN in a mobile communication system according to an exemplary embodiment of the present invention.

Referring to FIG. 16, the MN includes a communication module 1600 and a controller 1610. The controller 1610 includes an operation mode controller 1612 and a message manager 1614.

The communication module 1600 processes the signals transmitted and received to and from the MS or the BS under the control of the controller 1610. In more detail, the communication module 1600 processes a baseband signal output from the controller 1610 to an RF signal and sends the RF signal to the MS or the BS. The communication module 1600 processes an RF signal received from the MS or the BS to a baseband signal and outputs the baseband signal to the controller 1610.

The controller 1610 controls and processes the operations of the MN. By including the operation mode controller 1612, the controller 1610 controls and processes the operation for changing the operation mode as determined by the BS. The controller 1610 includes the message manager 1614 for analyzing and processing various messages transmitted and received, analyzing the operation mode in the message received from the BS, and generating and analyzing the message required to change the operation mode of the MN. In addition, the controller 1610 periodically measures its location and speed information and controls and processes the function for sending the measured information to the BS.

When it is necessary to switch to the Operation OFF mode in the process of the Operation ON mode, the controller 1610 controls and processes the function so that the active MS and the idle MSs serviced from the MN carry out the handover and the cell reselection to the serving BS before the switching to the Operation OFF mode. Conversely, when it is necessary to switch to the Operation ON mode in the process of the Operation OFF mode, the controller 1610 controls and processes the function so that the MSs in the service coverage area of the MN carry out the handover and the cell reselection from the serving BS to the MN after the switching to the Operation ON mode.

While the BS individually determines the operation mode by taking into account the speed of each MN, the BS may collectively determine the operation mode of the MNs and notify the determined operation mode to the MNs and the MN each may determine whether to change the operation mode by considering their speed.

In the mobile communication system, the BS determines the operation mode of the MNs in the cell service coverage area by taking into account the cell condition, and the MN changes the operation mode according to the determination of the BS. Therefore, in the high traffic area, the interference can be addressed by disabling every MN in the cell or the MN exerting considerable interference on the MS in the cell. In the low traffic area, the MN operates and exhibits its advantages.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Base Station (BS) for operating a Moving Network (MN) in a mobile communication system, the method comprising:
   determining an operation mode of every MN in a cell by collecting information of the cell and comparing the collected information to a corresponding predefined threshold value; and
   transmitting the determined operation mode to the MN,
   wherein the operation mode comprises at least one of an Operation ON mode in which the MN maintains links to Mobile Stations (MSs) in a service coverage area of the MN, and an Operation OFF mode in which the MN turns off the links to the MSs in the service coverage area of the MN.

2. The method of claim 1, wherein the determining of the operation mode of the MN comprises:
   collectively determining an operation mode of every MN in the cell by aggregating statistical information of the cell, and further wherein the statistical information of the cell comprises at least one of cell traffic amount, total interference amount of MSs in the cell, and the number of MSs in the cell.

3. The method of claim 1, wherein the determining of the operation mode of the MN comprises:
   determining an operation mode per MN using at least one of the number of MSs reporting a receive signal strength with respect to the MN, speed information of the MN, and location information of the MN.

4. The method of claim 3, wherein the determining of the operation mode per MN comprises:
   comparing the number of the MSs reporting the receive signal strength with respect to a particular MN with a threshold MS number; and
   when the number of the reporting MSs is greater than the threshold MS number, determining the operation mode of the particular MN by comparing a speed of the particular MN with a threshold speed.

5. The method of claim 1, further comprising:
   when the operation mode of the MN is determined as an Operation OFF mode, processing one of handover and cell reselection of MSs traveling in the service coverage area of the MN before the MN switches to the Operation OFF mode; and
   when the operation mode of the MN is determined as an Operation ON mode, processing one of handover and cell reselection of the MSs traveling in the service coverage area of the MN after the MN switches to the Operation ON mode.

6. An operating method of a Moving Network (MN) in a mobile communication system, the method comprising:
   receiving an operation mode from a Base Station (BS); and
   switching links to Mobile Stations (MSs) in a service coverage area of the MN according to the operation mode received from the BS,
   when the operation mode corresponds to switching the link off to the MSs in the service coverage area of the MN, processing one of handover and cell selection with respect to the MSs before switching off the link; and
   when the operation mode corresponds to switching the link on to the MSs in the service coverage area of the MN, processing one of handover and cell selection with respect to the MSs after switching on the link.

7. The method of claim 6, wherein the switching of links to MSs in the service coverage area of the MN according to the operation mode received from the BS comprises determining if the operation mode received from the BS differs from a current operation mode.

8. The method of claim 6, further comprising transmitting a response message notifying of one of the switching the link on and the switching the link off.

9. The method of claim 6, wherein the BS transmits the operation mode to the MN in response to feedback received from at least one of the MN and at least one of the MSs in the service coverage are of the MN.

10. An apparatus of a Base Station (BS) for operating a Moving Network (MN) in a mobile communication system, the apparatus comprising:
    a controller for determining an operation mode of every MN in a cell by collecting information of the cell and comparing the collected information to a corresponding predefined threshold value; and
    a communication module for transmitting the determined operation mode to the MN,
    wherein the operation mode comprises at least one of an Operation ON mode in which the MN maintains links to Mobile Stations (MSs) in a service coverage area of the MN, and an Operation OFF mode in which the MN turns off the links to the MSs in the service coverage area of the MN.

11. The apparatus of claim 10, wherein the controller collectively determines an operation mode of every MN in the cell by aggregating statistical information of the cell, and further wherein the statistical information of the cell comprises at least one of cell traffic amount, total interference amount of MSs in the cell, and the number of MSs in the cell.

12. The apparatus of claim 10, wherein the controller determines an operation mode per MN using at least one of the number of MSs reporting of a receive signal strength with respect to the MN, speed information of the MN, and location information of the MN.

13. The apparatus of claim 12, wherein, when the number of the MSs reporting the receive signal strength with respect to a particular MN is greater than a threshold MS number, the controller determines the operation mode of the particular MN by comparing a speed of the particular MN with a threshold speed.

14. The apparatus of claim 10, wherein, when the operation mode of the MN is determined as the Operation OFF mode, the controller processes one of handover and cell reselection of MSs traveling in the service coverage area of the MN before the MN switches to the Operation OFF mode, and when the operation mode of the MN is determined as the Operation ON mode, the controller processes one of handover and cell reselection of the MSs traveling in the service coverage area of the MN after the MN switches to the Operation ON mode.

15. An operating apparatus of a Moving Network (MN) in a mobile communication system, the apparatus comprising:

a communication module for receiving an operation mode from a Base Station (BS); and a controller for switching links to Mobile Stations (MSs) in a service coverage area of the MN according to the operation mode received from the BS, wherein, when the operation mode is a mode indicative of the link off to the MSs in the service coverage area of the MN, the controller performs handover or cell selection with respect to the MSs before turning off the link, and when the operation mode is a mode indicative of the link on to the MSs in the service coverage area of the MN, the controller performs the handover or the cell selection with respect to the MSs after turning on the link.

16. The apparatus of claim 15, wherein the switching of links to MSs in the service coverage area of the MN according to the operation mode received from the BS comprises determining if the operation mode received from the BS differs from a current operation mode.

17. The apparatus of claim 15, wherein the controller controls transmission of a response message notifying of one of the switching the link on and the switching the link off.

18. The apparatus of claim 15, wherein the BS transmits the operation mode to the MN in response to feedback received from at least one of the MN and at least one of the MSs in the service coverage are of the MN.

* * * * *